United States Patent
Lewcock et al.

(12) 
(10) Patent No.: US 6,397,551 B1
(45) Date of Patent: Jun. 4, 2002

(54) STRUCTURAL FRAMEWORK SYSTEMS

(75) Inventors: Keith Owen Lewcock, 31 High Street, Earlstoke, Wiltshire, SN10 5TZ; Ralph Peter Steven Bailey, West Sussex, both of (GB)

(73) Assignee: Keith Owen Lewcock (GB)

( * ) Notice: Subject to any disclaimer, the term of this patent is extended or adjusted under 35 U.S.C. 154(b) by 0 days.

(21) Appl. No.: 09/446,080

(22) PCT Filed: Jun. 19, 1998

(86) PCT No.: PCT/GB98/01796

§ 371 (c)(1), (2), (4) Date: Mar. 6, 2000

(87) PCT Pub. No.: WO98/58177

PCT Pub. Date: Dec. 23, 1998

(30) Foreign Application Priority Data

Jun. 19, 1997 (GB) ............................................. 9712980
May 26, 1998 (GB) ............................................. 9811263

(51) Int. Cl.⁷ ............................. E04C 2/38; E04H 12/10
(52) U.S. Cl. .................. 52/655.1; 52/653.1; 52/654.1; 52/656.9; 52/665; 403/170; 403/255; 403/297; 403/340
(58) Field of Search .............................. 52/236.7, 236.9, 52/238.1, 239, 653.1, 653.2, 654.1, 655.1, 656.9, 664, 665, 660, 731.3, 731.2, 732.2, 731.1, 732.1, 730.5–730.1, 731.5; 403/255, 292, 170, 316, 340

(56) References Cited

U.S. PATENT DOCUMENTS

| | | | |
|---|---|---|---|
| 3,226,897 A | * | 1/1966 | Dorman |
| 3,664,011 A | | 5/1972 | Labastrou |
| 3,828,516 A | | 8/1974 | Kern |
| 4,485,597 A | * | 12/1984 | Worrallo ......................... 52/36 |
| 4,556,337 A | * | 12/1985 | Marshall ....................... 403/255 |
| 4,750,310 A | * | 6/1988 | Holcombe .................... 52/731 |
| 5,070,662 A | | 12/1991 | Niese |
| 5,333,950 A | * | 8/1994 | Zachrai ................... 312/265.1 |
| 5,483,780 A | * | 1/1996 | Stumpf ...................... 52/650.3 |
| 5,657,604 A | * | 8/1997 | Malott ....................... 52/655.1 |
| 5,673,531 A | * | 10/1997 | Carcedo et al. ............. 52/656.9 |
| 5,737,893 A | * | 4/1998 | Rossiter et al. ............. 52/481.2 |

FOREIGN PATENT DOCUMENTS

CN 650302 7/1985

* cited by examiner

Primary Examiner—Carl D. Friedman
Assistant Examiner—Yvonne M. Horton
(74) Attorney, Agent, or Firm—Sterne, Kessler, Goldstein & Fox P.L.L.C.

(57) ABSTRACT

A structural framework system for the construction of exhibition display stands and the like makes use of a beam extrusions having dovetail shaped edge formations which enable panel frames to be hung therefrom and locked in position by virtue of coupling frames incorporating therein a locking element which can be retracted into a recess of the coupling frame for initial location of the coupling frame relative to a beam and can then be moved to project from the recess and to clamp the beam dovetail by insertion of actuating pins into bores provide in the coupling frame and communicating with the recess. A beam end fitting enables a beam to be secured to a transversely-extending second beam by a similar process and a 4-way node fitting enable nodes to be formed at the intersection of a plurality of orthogonal beams. A leg length adjustment provides for the adjustment of the lengths of structural support legs. A fabric roof may be attached to the framework system by virtue of a foot secured along the fabric edge being received in a shoe provided in the framework.

30 Claims, 10 Drawing Sheets

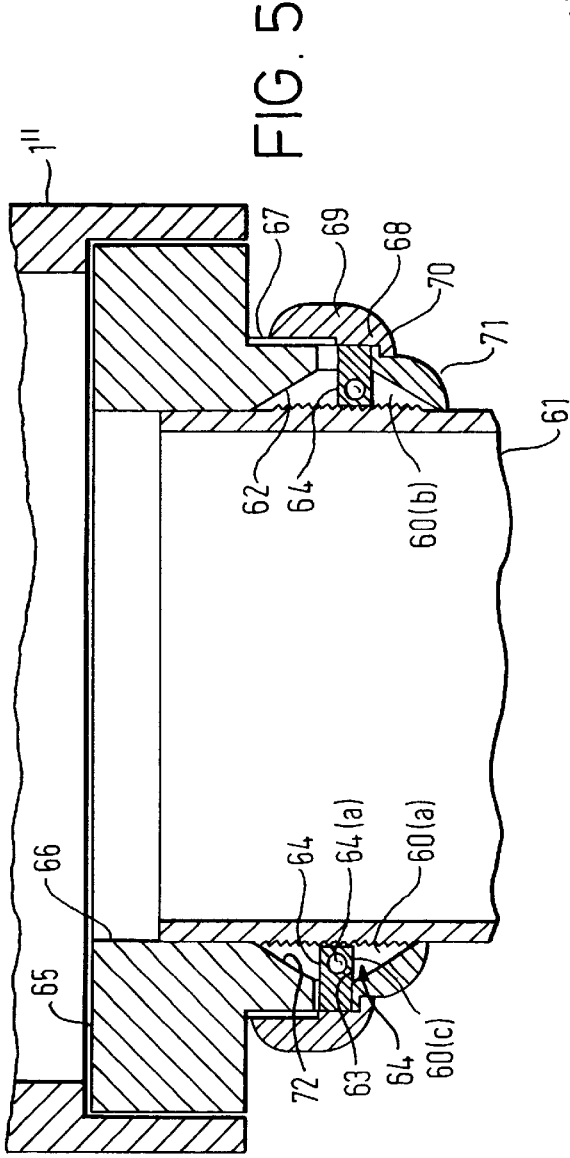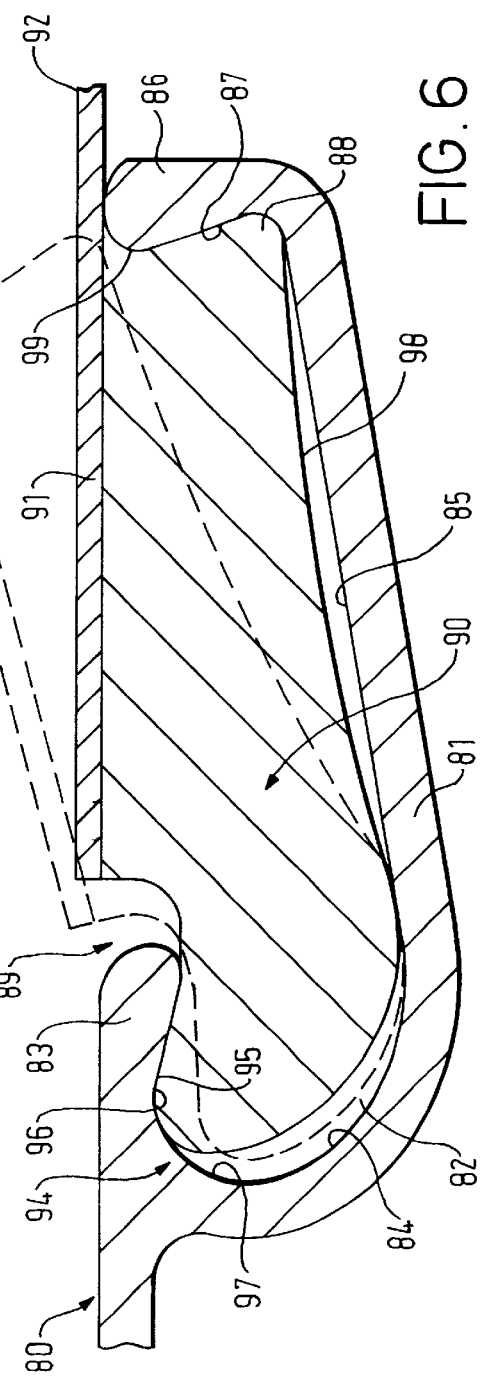

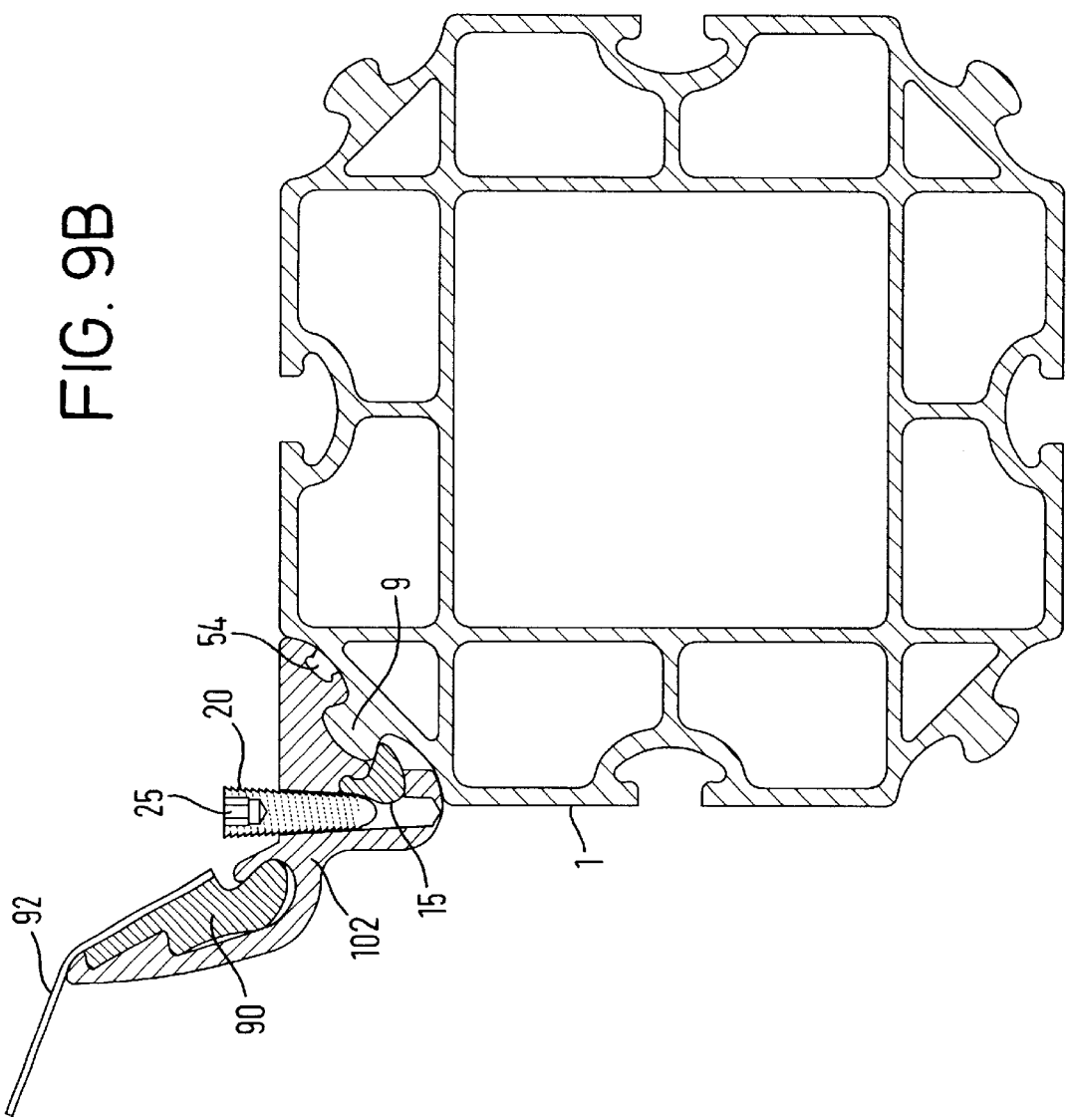

STRUCTURAL FRAMEWORK SYSTEMS

BACKGROUND OF THE INVENTION

1. Field of the Invention

This invention relates to structural framework systems such as may be utilized in the construction of prefabricated buildings or temporary and semi-permanent structures, for example display stands at exhibitions and showroom accommodation.

2. Background Art

Current framework construction systems are either crude, like scaffolding, making them difficult to waterproof, or require many specific components for various situations. Moreover, few systems have the flexibility to accommodate multi-storey or bespoke layouts with full reusability and fast assembly.

Aluminum frame structures conveniently rely heavily on screw-threaded fasteners, but aluminum itself is too soft to maintain a durable thread thereby forcing the use of rivet-on nuts and other steel threaded insert systems. Such systems require delicate use in often onerous conditions. When they fail in use such systems are very difficult if not impossible to repair.

It is thus an object of the present invention to provide a relocatable structure system in which the above mentioned disadvantages are overcome or at least substantially reduced.

BRIEF SUMMARY OF THE INVENTION

According to the present invention in one of the aspects there is provided a structure system where a linkage between individual frame members is effected using a pressed-in actuating element to position and hold a locking catch into a mating linear feature.

In one preferred embodiment of the present invention which is described in detail hereinafter, mating features of interconnectable frame members are formed as extruded parts and are effective symmetrically as a dovetailed joint, enabling connections to be made from two orthogonal directions. In one component of the described structure system the mating dovetail features occur at a chamfer angle at the vertices of a substantially square beam section such that panels or further beams are attachable to continue any of the orthogonal surface planes of the beam, such attachment being effected by hooking a feature of the further structural member to one side of the beam dovetail and engaging the locking catch on the other side of the beam dovetail by operation of a plurality of spaced apart actuating elements.

In the abovementioned embodiment the actuating elements comprise pins which are locatable in respective recesses in the further structural member for engaging upon movement into the recess a moveable catch element which moves to lock the parts together. Conveniently, the actuating elements are elongate tapered pins having a high-helix, multi-start, low-profile surface protrusion and a head formed to enable rotation of the pin, for example by means of a hex tool. The high helix topography causes the pins to rotate as they are tapped home and then ensures that they cannot be accidentally extracted. To remove a pin, a tool is used to rotate it by a partial turn and the rotation of the helix profile causes the pin to be slightly extracted. Because it is tapered, once the pin is a little loose it can be readily removed.

The recess into which the actuating pin extends communicates with a recess adapted to accommodate the catch element which is preferably generally L-shaped in cross-section and is arranged so that, when the actuating pin is not in place, the catch element can be retracted substantially into its accommodating recess so as to be inoperative and, when the actuating pin is inserted, the catch element is moved so as to project from the recess for engaging another of the interconnectable frame members to lock the two together. The catch member can include a surface complementary to and engageable by the actuating pin to effect operation of the catch, or alternatively the catch can be formed of a relatively soft material such as aluminum which can be deformed by coaction with a harder material actuating pin.

The dovetail joint can advantageously include a weather seal located in one of its mating surfaces to seal the connection. An annular weather seal can also be provided in the recess for the actuating pin to seal the actuating pin once it is fully inserted into its recess.

Construction beams used in the structure system of the present invention are conveniently of a hollow rectangular box section having internal webs to add strength to the beam. End blanking components are attachable to the ends of the beam and the blanking components can advantageously have complementary mating features to allow connection of the blanked off end of a beam with the dovetail feature of a further beam extending transversely thereto. Similar 4-way crown components enable nodes to be formed by the joining of plural beam ends.

Preferably, infill pads formed of blastomeric material for example are mountable on either side of a junction between frame members to seal the junction and render it waterproof.

The invention extends furthermore to an adjustment system enabling leg structures to be adjusted in length. In a hereinafter described embodiment of this aspect of the invention a frame member is provided with a circular bore within which a selectively adjustable tubular leg is mounted. Wedges are provided which can be adjusted to secure or release the tube in dependence upon the adjustment of a securing ring, and the surfaces of the wedges which bear on the tubular leg are provided with screw thread sections which can impress a complementary thread on the tubular leg thereby enabling the leg length to be adjusted in a precision manner by relative rotation.

The system of the present invention also extends to an interlocking "shoe" and "foot" arrangement for securing a fabric roof relative to a building structure or the like, and the roof fabric being attached at or adjacent its edge to an elongate foot extrusion which is insertable into an elongate shoe extrusion formed on or secured to the building structure. A toe region of the foot is preferably curved upwardly to engage in a recess below a holding lip of the shoe and a heel of the foot is held in an undercut provided at the heel of the shoe. Preferably, the foot and shoe interconnection is such as to include two heel structures, one behind the other.

Structures formed in accordance with the teachings of the present invention preferably employ extruded aluminum beams, widely regarded in the building industry as the most cost effective material for lightweight structures. Although basically modular, the system is flexible enough to permit a wide variety of support and spans, enabling structures to be tailored into specific forms previously only attainable with premium bespoke solutions. These can include features like balconies, atrium and elevated walkways. The structure system is integrally designed with its own structural platform flooring system which is able to accommodate onerous ground topologies. This minimises the need for site preparation. However, as described hereinafter attention is given to the need to apply ballast to hold structures down and a self leveling soft ground support system is also utilised. Roofing integration permits either usable upper platform space or large span truss frameworks. The relocatable structure system of the present invention proposes a linking system that allows full interchangeability between beams, floor panels, wall panels, roof panels or modules at all orthogonal angles. However, other angles are possible.

The above and further features of the present invention are set forth in the appended claims and will be described hereinafter by reference to exemplary embodiments which are illustrated in the accompanying drawings.

BRIEF DESCRIPTION OF THE DRAWINGS

FIG. 5 is a cross-sectional view of an adjustable leg fitting embodying the present invention with the parts shown in a fully tightened position on the left hand side of the figure and in a loosened position on the right hand side of the figure.

FIG. 6 is a cross-sectional view of an exemplary arrangement according to the present invention for attaching a fabric roof to a building structure.

FIG. 9B is a part sectional end view of part of the roof structure of FIG. 9A.

DETAILED DESCRIPTION OF THE INVENTION

Figure 1:
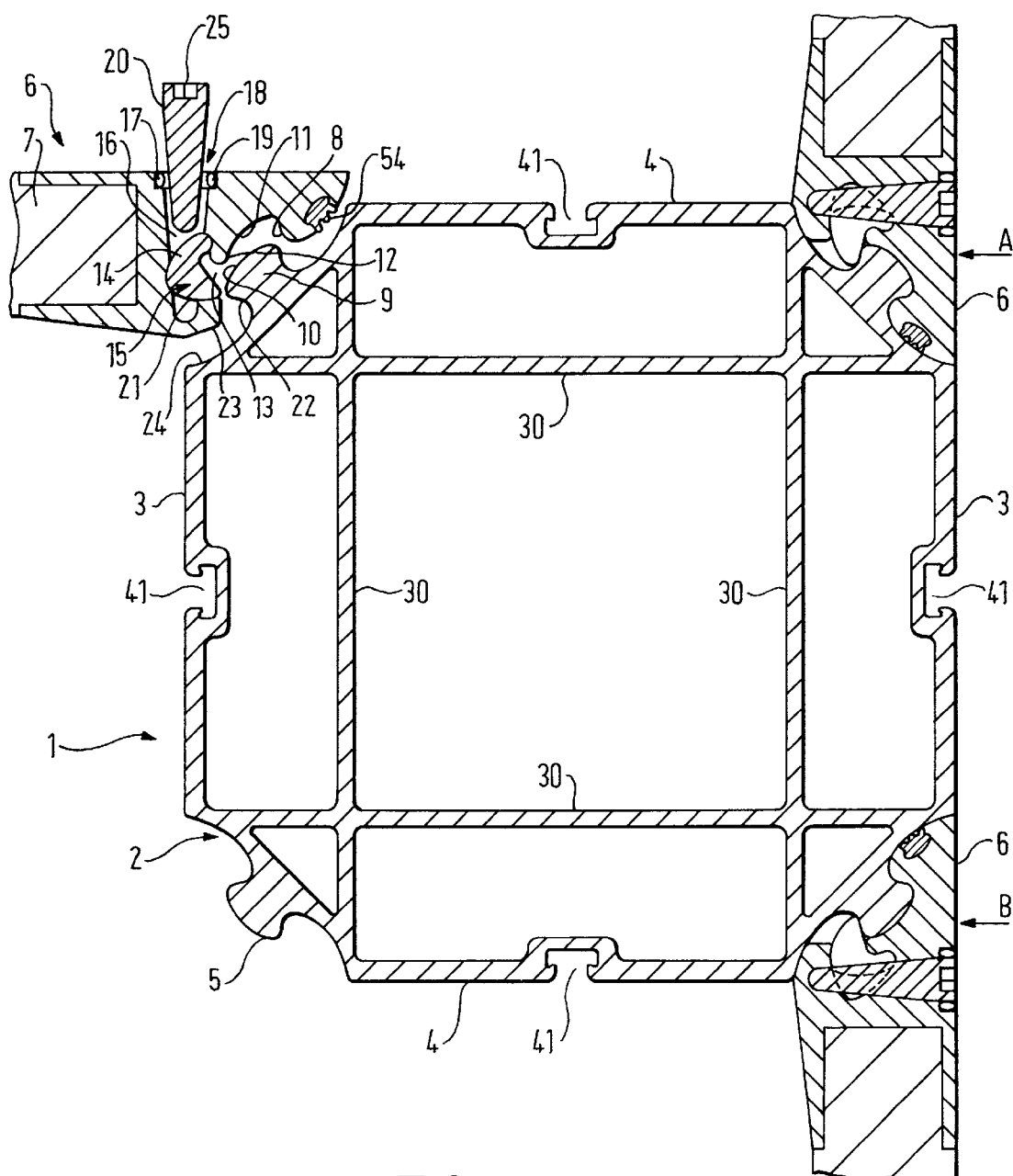
FIG. 1 is a cross-section view of an extruded beam embodying the invention and showing one panel section in course of assembly to the beam and two other panel sections already assembled, the panel sections including frame extrusions adapted to couple with the beam.

Referring more specifically to the drawings, FIG. 1 shows a cross-sectional view of an elongate support beam 1 having connected there to a plurality of wall or floor sections which extend in directions substantially perpendicular to the beam 1. The beam 1 is formed or extruded aluminum with a substantially rectangular cross-section and has extending longitudinally of the beam at each corner 2 thereof a symmetrical curvilinear dovetail formation 5, set chamfer-like at an angle of 45° to the external surfaces 3, 4 respectively of beam 1.

An extruded aluminum coupling frame 6 is arranged to support a panel 7, a wall or flooring or roof panel for example, to be assembled to the beam 1, and has a hook shape connector part 8 complementary to the dovetail 5 so that the panel coupling frame 6 can be "hung" on the dovetail 5 as shown in FIG. 1 at top left. Projecting dovetail part 9 has a convex outer surface 10 and the coupling frame 6 has a complementary concave surface 11 against which surface 10 of the dovetail 9 fits in use as shown at top and bottom right in FIG. 1. The surface 11 culminates in a projecting nose portion 12 and there is an elongate recess 13 on the reverse side of nose portion 12. The complementary shapes of the dovetail formation 5 and the co-operating part of the coupling frame 6 are completed by surface 23 of the frame 6 which rests upon dovetail surface portion 24 extending from the concave surface portion 22 when the frame 6 is close coupled with the beam 1.

An elongate, generally rounded L-shaped locking element 15 is located in recess 13 and in operation pivots in the recess as described hereinafter. A circular cross-section, tapered bore 16 communicates with the recess 13 and has a portion 17 of increased radial dimension at its opening 18. A seal 19 is located in the portion 17. The elongate locking element 15 is an aluminum extrusion which fits loosely into the recess 13 and can be pivoted about the end of its shorter limb 14 between the position shown at top left in FIG. 1 where it is substantially wholly contained within the recess and the position shown at top and bottom right in FIG. 1 where the longer limb 21 of the element 15 protrudes from the recess 13 and engages under the projecting dovetail part 9 of beam 1.

To effect such pivotal movement of the locking element 15, an elongate tapered pin 20 having a high-helix, multi-start, low-profile screw threaded surface protrusion (not shown) and a head having a hex tool compliant socket 25 is introduced through opening 18 into the bore 16 and is tapped down into the bore by use of a soft mallet. The pin interferes with the locking element 15 as it is driven in and causes the element 15 to pivot so as to lock the coupling frame 6 onto the dovetail formation 5 on the beam 1. Pins 20 are driven into bores 16 at plural spaced-apart locations along the length of the coupling frame extrusion 6. The pins prevent reverse rotation of the locking element 15 and ensure that the structure remains fixed under compressive preload.

From the foregoing it will be appreciated that the present invention resides in the provision of a base member, such as the beam 1 of FIG. 1, having formations such as to enable a conforming member, such as the coupling frame 6 of FIG. 1, to be clamped thereto by a simple operation comprising the insertion of elements, such as the pins 20, which actuate a clamping mechanism, such as the locking element 15, so as to couple the two parts together. The conforming member has external features enabling it to act at a hanger from the base member and has internal features enabling it to retain the elongate rolling wedge locking member extrusion. Bores 16 for the pins 20 are located at spaced apart intervals along the elongate coupling frame 6 and are drilled to accept the locking pins 20. The bores 16 can be drilled with the locking member 15 inserted into recess 13 and opened to its locking position such that the bores will partially intersect with the locking member and thereby increase the surface area on the locking member that will interact with the pins when they are inserted. Alternatively, the bores can be drilled without the locking member present in which case the pins would deform the locking member in use.

In use, the parts are initially brought together with the locking element 15 in its retracted position within its recess 13 such that the coupling frame 6 closely engages with the dovetail formation on the beam 1. The tapered locking pins 20 are then inserted and tapped home. As the pins 20 enter into bores 16 they rotate or otherwise displace the locking element 15 such that its limb 21 is caused to extend out of the recess 13 and act against the underside of the dovetail formation on the beam 1 thereby pulling the joint together. The locking pins 20 once inserted remain wedged between the locking element and coupling frame extrusions, but can be loosened and extracted by being turned with a key engaged with the hex head 21.

Instead of tapered pins 20, discrete wedge channels may be milled or otherwise prepared to accept wedge shaped inserts. These would act substantially as the pins in displacing the locking element to interlock with the dovetail. Also the dovetail formation may comprise several smaller dovetail barbs in each direction, rather than just one large barb. The rolling wedge locking element would then also have a conforming section able to interact effectively with the multi-barbed dovetail design.

The coupling frame extrusions 6 are designed to accept floor, wall or roof panels. The coupling frame 6 can be mitred to act as a rigid frame to a panel infill, or left loose so that the panels can "float" to accommodate fit tolerances and thermal expansion. In this latter instance the unimpeded coupling frame 6 will lock fully to the dovetail on the beam extrusion 1, acting as a rigid extension of the beam which then traps and holds the infill panel 7.

Figure 2A:
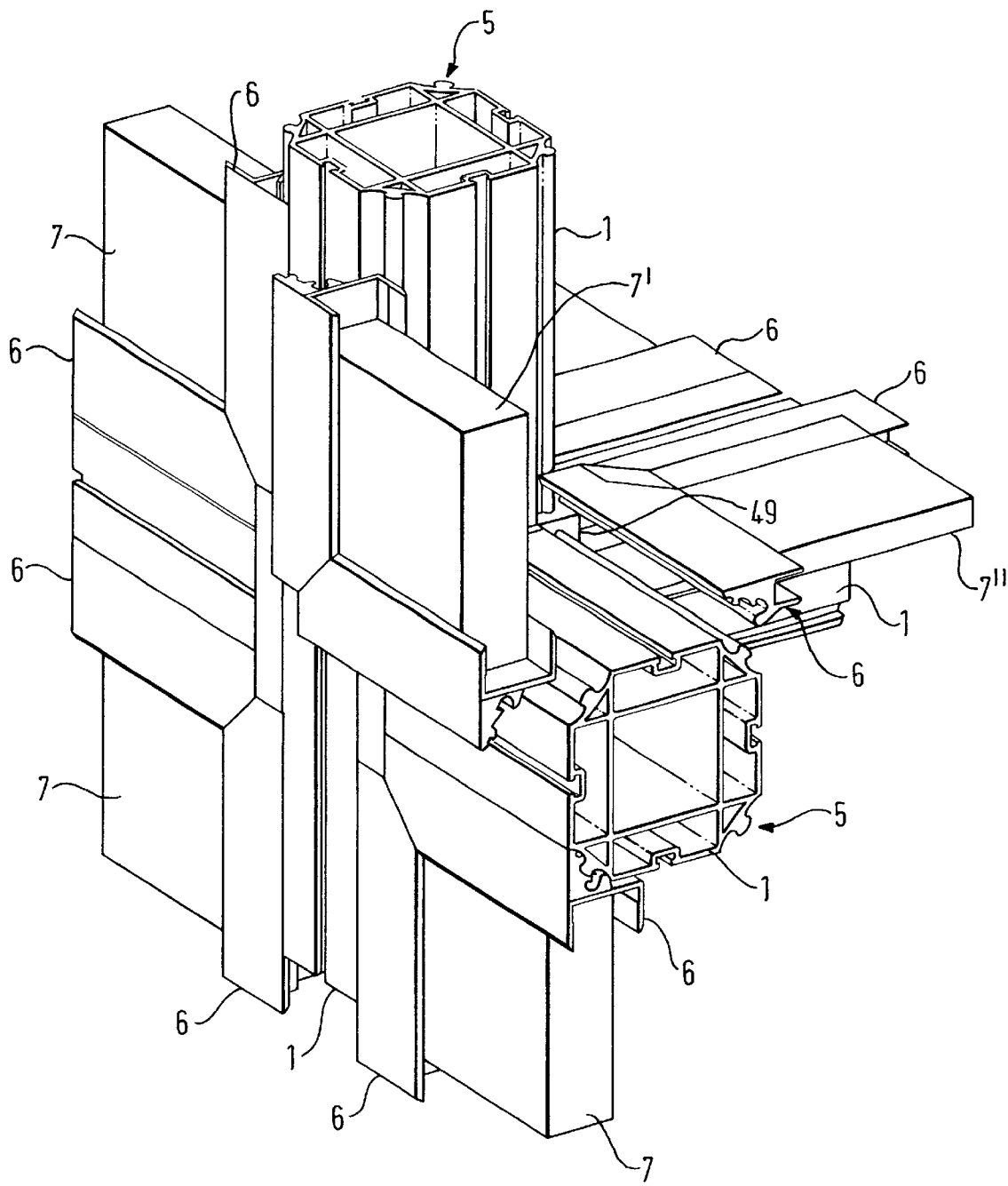
FIGS. 2A and 2B are perspective views from two different directions showing orthogonally connected beams as in FIG. 1 having facing (wall) and floor panels coupled and in course of being coupled thereto as in FIG. 1.
Figure 2B:
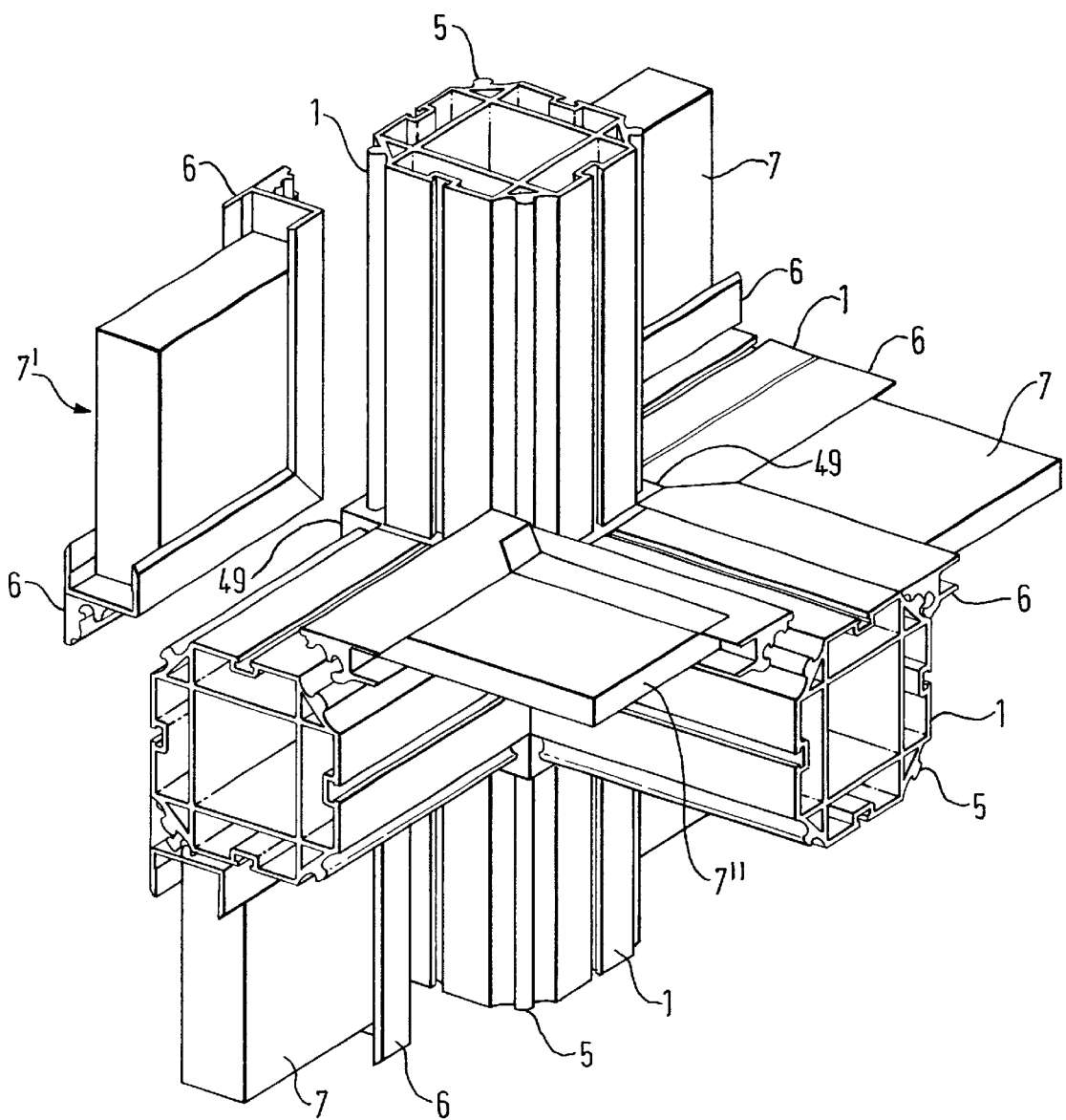

FIGS. 2A and 2B show perspective views from different directions of an arrangement wherein orthogonal beams provide support for facing (wall) and floor panels, the beams being as shown in FIG. 1 and the panels being supported by frame extrusions as shown in FIG. 1. The means for interconnecting the beams will be described hereinafter with reference to FIG. 3, but from FIGS. 2A and 2B it can readily be seen how the system of the invention provides for panelling to be applied to a framework structure. Note that in FIGS. 2A and 2B the wall panel 7' and the floor panel 7" are not fully in place.

Figure 3:
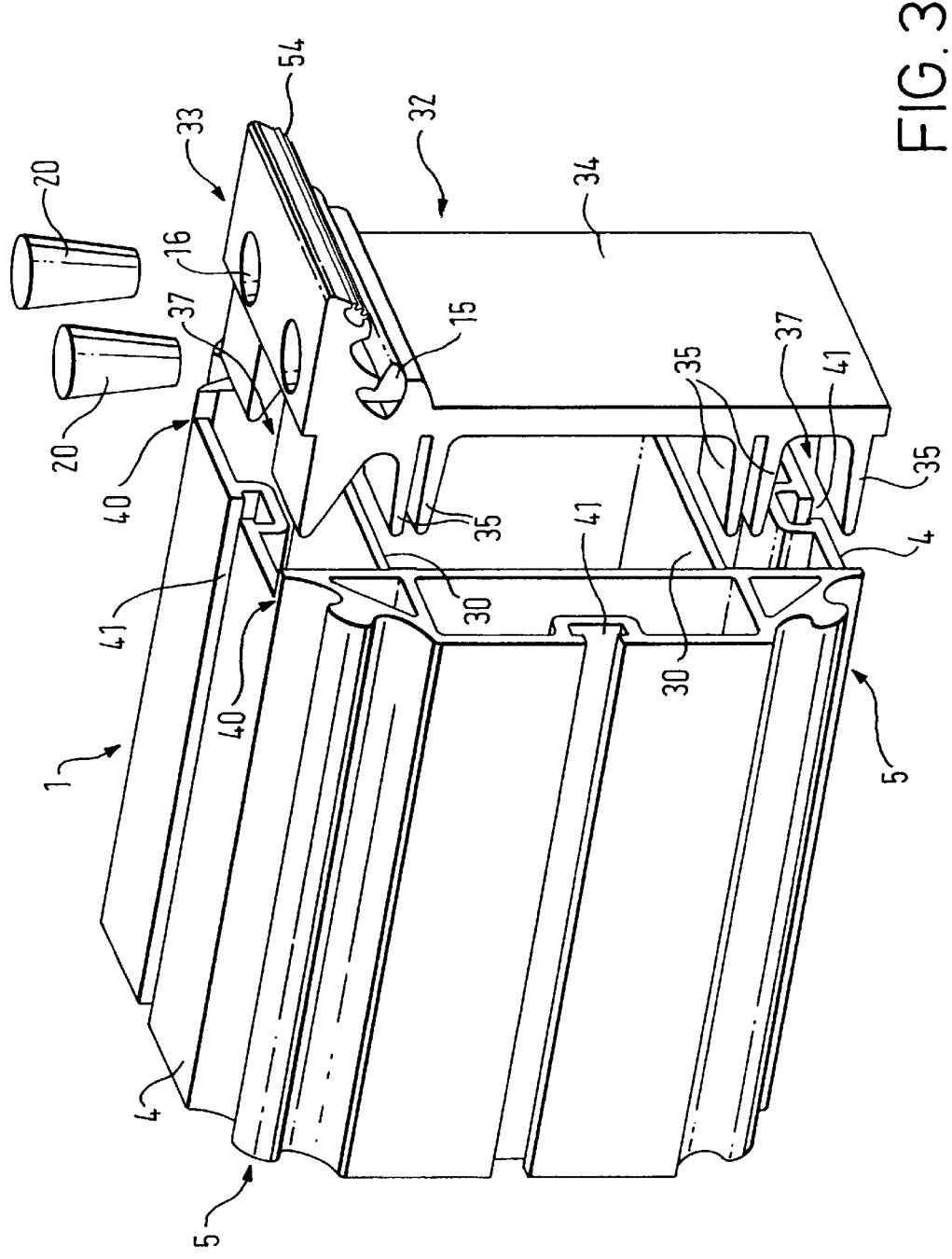
FIG. 3 is a perspective view of one end of the beam of FIG. 1 and further shows an end fitting connector piece adapted to be fitted to the end of the beam to enable the beam to be clamped to a further beam extending transversely.

As shown in FIG. 3, beam end fittings 32 are arranged to be fitted into the ends of beams 1 as described hereinbefore so that the support axis is orthogonal to the beam 1, thus enabling a beam end to be coupled to the side of a transverse second beam. Beam end fitting 32 is shown in FIG. 3 to comprise a head portion 33 which has a cross-sectional shape substantially the same as that of the support frames 6 shown in FIG. 1 and functions in the same manner as regards the clamping of the head portion to a dovetail formation of a riser beam 1. Depending from head portion 33 is a flat plate 34 having a plurality of flanges 35 extending substantially perpendicularly from the rear thereof, the flanges 35 being arranged to fit closely to the upper and lower faces 4 of the beam 1 on the inside of the beam box section and above and below the webs 30 of the beam when the fitting 32 is fitted into the open end of the beam. The fitting 32 can be designed to be retained by virtue of being an interference fit into the open end of a beam 1 or could be retained by adhesive or by means of appropriately inserted fixing screws. It will be noted that the upper and lower faces 4 of the beam 1 at the end thereof into which the fitting 32 is to be fitted can be cut back (as shown clearly at 40 in FIG. 3) to enable the flat plate 34 of the fitting 32 to lie flush with the beam end. It will further be noted that the beam 1 has a slotted formation 41 at the centre of each of its faces and that slots 37 are cut into the fitting 32 so that it clears these formations. The purpose of the formations 41 will be explained later.

The end fittings 32 are very economical to produce by extrusion, even though some final machining is necessary to cut the slots 37 and form the bores 16 for the pins 20 which actuate the locking element 15. The basic extrusion has merely to be cut into short sections defining the end fittings prior to their final machining and drilling. Similar end fittings could be formed by casting and equivalent angled end fittings enabling a beam end to be coupled to the side of another beam as an angle other than 90° thereto could also be formed by casting.

Figures 4A, 4B, 4C:
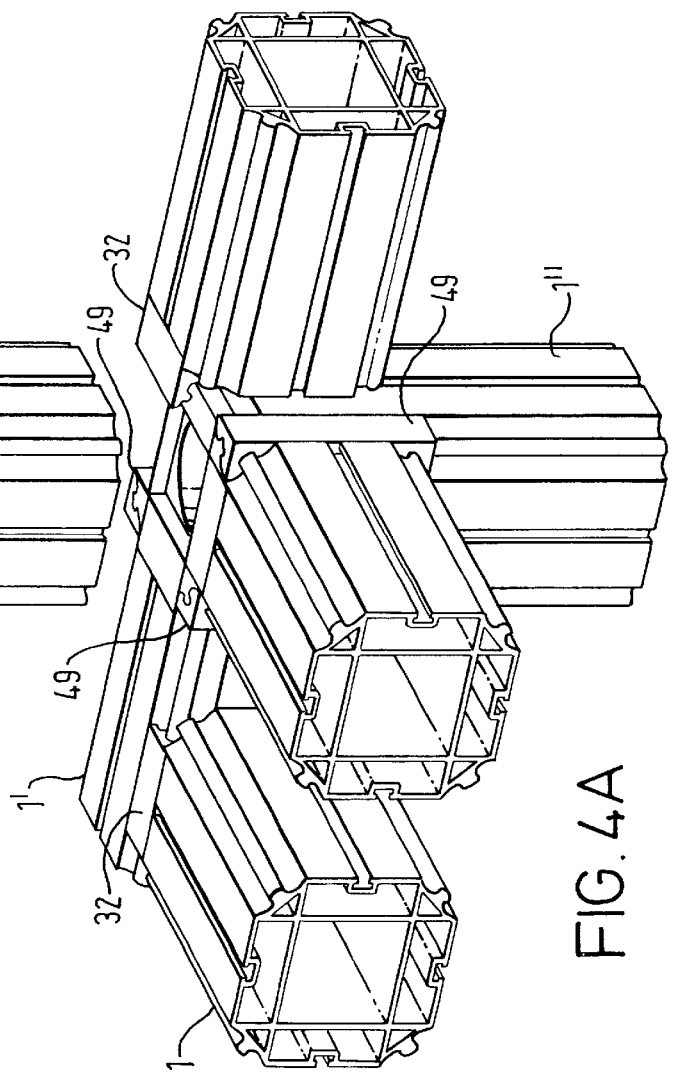
FIG. 4A is a perspective view showing two beams joined together by the arrangement of FIG. 3 and further showing a node construction.
FIG. 4B is a perspective view of a 4-way coupling port enabling a vertically-extending beam to have four horizontally-extending beams affixed thereto as shown in FIG. 4A.
FIG. 4C shows a bracing element.

FIG. 4A of the accompanying drawings shows how end fittings as described with reference to FIG. 3 can be utilized to couple the end of one beam to the side of a second, transversely extending beam. FIG. 4A also shows how nodes can be formed by use of a 4-way end fitting which replicates the beam fitting 32 of FIG. 3 in four directions. Referring to FIG. 4A, there is shown on the left thereof a beam 1 which is affixed transversely to the side of a second beam 1' by means of an end fitting 32 as hereinbefore described. FIG. 4A further shows the end of the beam 1' coupled to a node defined at the end of yet another beam 1" extending transversely to the beam 1' and also shows two other beams coupled to the beam 1" in similar manner to the beam 1' but extending therefrom in different directions, the beam opposite to beam 1' being shown not fully in position.

FIG. 4B shows a 4-way node fitting 45 coupled to the end of a riser beam 1" as in FIG. 4A. The node fitting 45 is formed of cast aluminum and has four sections 46 which replicate the dovetail edge formations of the beam 1" but in transverse directions and four sections 47 which continue the dovetail edge formations of the beam in the same direction. Each of the transverse dovetail sections 46 enables the coupling of a beam end to the end of beam 1" by use of an end fitting 32 as described with reference to FIG. 3. On the reverse of the crown-like neck fitting 45, spigot components (not shown) are provided which are adapted to be fitted into the open end of riser beam 1", similarly to the action of fitting the end fitting 32, and enable the node fitting 45 to be retained to the beam end either as an interference fit or by means of adhesive and/or appropriately positioned screws. As shown, the node fitting 45 has a central opening 48 which passes right through the fitting to support the bussing of services or to act as a drainage channel for example.

Elastomeric seal blocks 49 are shown in FIG. 4A fitted at the corners of the beam 1" and serve to fill the spaces that otherwise would exist between the beam 1" and the beams beam 1' coupled thereto. The blocks 49 are shaped to engage with the dovetail edge formations of the beam 1". The seal blocks 49 can advantageously be made slightly oversize so that they can also act as compliant positioning pads to locate the beam end connector fittings 32 which, to provide for some compliance in the setting of the beams in their nodes, can be dimensioned so as to be capable of moving a little along the junction dovetail defined by the sections 46, within limits defined by the elastomeric seal blocks. The elastomeric seal blocks fit into each upper vertex of the cubic node and serve the purpose of providing a weather seal through the permitted range of compliance. The joint will be naturally self centering.

Where coupling frame extrusions 6 are used to retain infill panels as hereinbefore described, elastomeric seal blocks 49 may be employed to fill the spaces otherwise occurring between the connected parts when the system design does not lend itself to being neatly mitred. FIGS. 2A and 2B illustrate this. Here again the seal blocks can act to provide self centering with compliance and weather sealing.

A further weather seal 54 can be fitted into a recess provided for this purpose in the hook shaped connector part 8 of the coupling frame 6 as shown in FIG. 1. A similar provision can be made in the beam end fitting 32 as shown in FIG. 3. This seal could alternatively be provided in the dovetail edge formations of the beam 1. In conjunction with the elastomeric seal blocks 49 abovementioned, the seal strips 54 can ensure complete weather sealing of a structure without need for on-site patching of joints and edges which is not only time consuming but also is unsightly.

It was mentioned in connection with the description of FIG. 3 that the beam extrusions 1 were formed on each surface 3, 4 thereof with a slotted formation 41. The purpose of this formation is to enable locating and/or strengthening elements to be incorporated when, for example, a multistorey structure is constructed which includes node configurations such as shown in FIG. 4A wherein the beam 1" is vertically extending and the lower end of a second vertically-extending beam is supported on the node. FIG. 4C is a perspective view of an exemplary bracing element 50 in the form of a metal plate shaped as a right-angled triangle with a cut-out at its 90° apex and with T-shaped formations along its adjacent edges complementary to the slotted formation 41 provided in the beams. It will readily be appreciated that the lower edge of the bracing element 50 can be slid into the formation 41 of the right-hand beam of FIG. 4A and located so that when the vertical beam of FIG. 4B is set down upon the FIG. 4A node, the vertical edge of the bracing element 50 can be engaged into the formation 41 of the descending FIG. 4B beam. If this is done for all the horizontal beams of the node, the FIG. 4B beam will be positively located with respect to the node. The bracing element 50 could readily be arranged to be locked in position by means of locking wedges or screw fasteners for example.

Sliders capable of being locked into the slotted formations 41 and having parts protruding therefrom could have other applications and could be introduced into the formations either from the beam ends or by a local spoiling of the formations enabling the slider to be inserted. Such sliders could have fastener compliant extensions protruding from the formations 41 so that sliders installed in both horizontal beams and vertical risers can be arranged to mate and be secured to each other.

Where vertical riser beams need to be supported rigidly orthogonal to horizontal beams to provide necessary structural stability, trusses can be employed and might, for example, extend diagonally between opposite internal corners of a rectangular frame segment comprised of two riser beams and two horizontal beams. As required for local support, or if full anti-paralleling stability is required when the trusses are only tensile members such as tightened cables, two such trusses can connect opposite corners such that they cross in the centre. The trusses can be fixed into the corners using the bracing element 50 abovementioned or other slider components. If separate slider components having overlapping features are used and the truss has a further overlapping feature, a single pin or fastener can be employed not only to lock the slider components to each other but also to attach the truss.

The invention also provides for the adjustment of the lengths of structural support legs constituted for example by vertical riser beams such as the beam 1" shown in FIG. 4A so as to enable a structure to be readily erected on uneven ground. Hereinafter described is an adjustable length fitting which could be adapted to fit into the open end of a riser beam extrusion as illustrated in FIG. 5, or, in other configurations, could be incorporated as part of the 4-way crown fitting 45 of FIG. 4B for example.

As shown in FIG. 5 one such adjustable length fitting includes a circumferential array of spaced-apart radial double wedge elements 60(a), 60(b) nationally describing an open tube adjustable diameter in dependence upon the circumferential spacing apart of the wedge elements. The radially outer surfaces 62 of the wedge elements are chamfered to a fine taper angle and the inner surfaces carry screw thread profiles. The wedges are split axially with gaps 63 between them. Flat radially extending sides 60(c) of the wedges are separated by small elastomeric pads 64 which serve to bias the split wedge parts apart from each other. Instead of elastomeric pads, the radial wedges can include a feature designed to locate an expanding spring.

A support 65 is designed to be attached to other constructional fixtures, for example into the open lower end of a riser beam 1" as hereinbefore described and as shown in FIG. 5. The support 65 has an inner cylindrical bore 66 which features a chamfer taper conforming to the upper parts of the wedges 60. The taper surface 66 and the taper surfaces of the wedges can advantageously be provided with a low friction surface. A screw thread 67 is provided on radially outer surface 68 of the support 65 and an internally screw threaded securing ring 69 is engaged with screw thread 67 to enable the axial position of the securing ring to be adjusted relative to the support 65.

The securing ring 69 acts as a nut and has an inwardly facing flange 70 which coacts with an annular compression part 71 to determine the condition of the wedge 60. The compression part 71 has a wedge conforming taper 72 which engages the lower wedge surfaces of the wedges 60 and further has an array of tongues or keys (not shown) which extend into the circumferential gaps between the wedge elements 60(a), 60(b) so as to permit the wedge array as a whole to be engaged and rotated by the compression part 71. Both the securing ring 69 and the compression part 71 have outwardly facing contours (not shown) designed to promote gripping by hand or tool for the purpose or enabling rotation of the same.

When the unit is assembled, the sprung array of wedge elements 60(a), 60(b) are installed in the radial compression part 71 with the tongues or keys abovementioned located circumferentially between the wedge elements. The securing ring 69 is then installed over the. compression part 71 and screw threadingly engaged with the support fitting 65. A plain tubular leg 61 is then inserted through the inner cylindrical bore of the assembly. The tubular strut 61 has a diameter a little smaller than the expanded wedge system thereby allowing the leg 61 to slide freely through the fitting for course length adjustment. As the securing ring 69 is tightened onto the support 65, the conforming wedge faces compress the wedge 60 until it bears upon the leg 61.

Although the bearing pressure of the wedge 60 on the leg 61 is modest the internal thread of the wedge elements 60(a), 60(b) bear upon the softer metal of the leg 61 (for example hardened steel against aluminum), so that the wedges elastically deform the strut and forge a mating screw thread counterpart on the outer surface of the strut. In this state of compression, the compression part 71 (with its tongues or keys located between the circumferentially spaced wedge segments) acts as a captive nut enabling the leg 61 to be rotated through the fitting 65, thereby increasing or reducing the effective length of the leg.

In use, load exerted on the strut will tend to tighten the wedge array in proportion thereto, further ensuring a firm grip. An unambiguous metal to metal connection then exists to rigidly lock the leg 61 to the support 65.

In an alternative embodiment, instead of two tapered wedge faces on the array members only a single wedge face is employed, the other face being flat. In this case, the support 65 no longer compresses radially, but only axially. The radial compression of the wedge parts is solely effected by the compression part 71 and securing ring 69. This option mitigates friction when compression part 71 is employed as a nut, but at the expense of some clamping leverage.

The tubular legs 61 can stand on their own weight distribution pads where conditions allow. However, in soft conditions, a more effective method of weight distribution is to provide for connecting struts between the ground bases of the support legs wherever sinkage could be a problem. In this event an extrusion profile is determined with a large downwardly facing surface area optionally with features arranged to inhibit lateral sliding. The beam accepts end plugs which can slide telescopically into either or both of the beam ends, thereby enabling the beam length to freely adjust over a small range. The end plugs are in turn attached to the support leg bases with a pivoting and rotating joint such as a ball and socket, so that the ground beams need not lie orthogonally to the main framework system. They can thereby adjust in length and angle to better follow the prevailing ground topology. The upward face of the ground extrusion usefully has features enabling additional braces to be attached wherein required between itself and the levelled off floor beams.

The constructional system hereinbefore described makes use of symmetrical beam sections which enable infill panels to be fitted to either or both sides of a beam. This is advantageous where the structure cannot be retained relative to the ground with appropriate fastenings so that it proves necessary to provide ballast, especially on tall multi-storey structures. In this case infill panels may be installed where appropriate into the bottom of the base floor frame cells. A suitable large mass such as a large concrete slab may then be dropped into the frame to be supported by the bottom infill panel. A top infill panel can then be installed as before, creating in essence a very heavy floor panel.

Although principally described as an orthogonally modular structure system, the present invention could be implemented with extrusions establishing different holding angels for infill panels and different node and beam and hanger angles. This would cause floor plans including triangles and other polygons to become possible. Likewise, walls need not rise vertically, or roof and floor modules be always horizontal.

There are many instances when it is necessary to join a flexible fabric skin to a rigid frame such as may be formed from the beam structure disclosed with reference to FIG. 1 to 5 to form an adequate roof with appropriate tensioning of the roof fabric. The coupling of the roof fabric to the frame must be flexible, waterproof and readily fitted and removed. There are several established methods available but all have drawbacks. Lacing and buckling systems are difficult to seal. Rope welded into a pocket at the edge of a fabric and then slid into an extrusion with a narrow continuous opening is difficult to fit and impossible to fit as a continuous band. Other bespoke systems utilizing extruded wedge elements which rotate to trap a suitably expanded fabric edge can jam and are not easily adjusted to balance fabric tension. It is thus a further feature of the present invention that a means is provided which overcomes or at least substantially reduces these problems in a neat and effective manner. The concept is to provide an extruded "foot" at the fabric edge and an extruded slip-on "shoe" in the structure arranged to receive the "foot".

Referring to FIG. 6, an exemplary "foot" and "shoe" arrangement 80 comprises an extruded aluminum shoe 80 defining a recessed foot receiving area 82 bounded to its forward (toe) end by a lip 83. The internal surface 84 of recess 82 curves away from the lip 83, merging with an elongate flat base surface 85 which terminates in a heel part 86 of the shoe having a surface 87 which is inwardly directed towards the lip 83 to define a retaining undercut heel 88 of the foot 90. The shoe is otherwise open at 89 for receiving foot 90 therein.

The foot 90 is a further extrusion and has an external surface shape which is substantially complementary to the internal shape of the shoe with an enlarged bulbous toe portion 93, a slightly inwardly curved bottom surface 98, and a rounded heel 88. The foot 90 also comprises a major flat planar top surface 91 to which there is attached in any suitable manner, such as by gluing, chemical bonding or riveting for example, an elongate edge of a roof fabric 92.

When the foot 90 is inserted into the shoe opening 89, the toe portion 93 enters into the recess 82 below the lip 83 and moves forwardly to engage the forward end of the recess. Curved upper portion 95 of the top of the foot 90 is received in an undercut 96 of curved inner surface 97 of the lip 83 to assist in preventing unwanted release of the foot 90 from the shoe 81 once the foot is fully within the shoe. The elongate curved under surface 98 has the effect of reducing the thickness of the foot and thereby increasing its resilience to enable the heel 88 of the foot to pass inwardly-directed upper edge 99 of the shoe. As the foot 90 is moved into the shoe 81, it is pivoted clockwise about the toe receiving region of the shoe so that the heel 88 of the foot 90 moves simultaneously into the heel portion 86 of the shoe and slides back to contact the inner surface 87 of the heel 86 with a complementary fit which ensures that it cannot pull out when the fabric 92 is tensioned.

Because of the distance between toe and heel, the coupling referred to above need only be rotated by a small angle to allow the heel to engage. This makes fitting easier but also consequently is susceptible to easy release. The longitudinal plane of the shoe needs to be arranged at an angle such that it is always steeper than the steepest expected fabric tension vector, or the heel could inadvertently become disengaged. A disadvantage of a long foot is the increased risk that it may deform under tension to an extent sufficient for the toe to be released from under the shoe lip. For operational reasons it is helpful for the foot extrusion to be as flexible as possible, but if it is too flexible, this risk is further increased. Consideration also needs to be given to the temperature operating range because suitably plasticised thermoplastics materials soften significantly when warned and may as a result cause uncoupling of the joint. A typical preferred material for the foot extrusion would be plasticiser PVC which is available in a wide range of elasticities.

Figure 7:
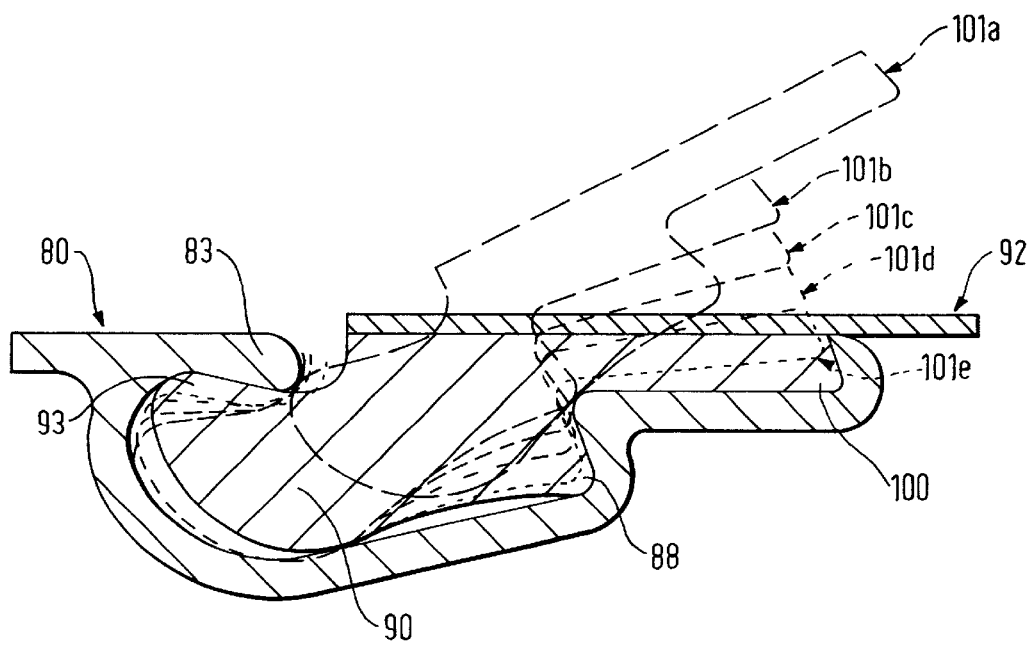
FIG. 7 is a view similar to FIG. 6 in which the foot and shoe interconnection has a double heel structure.

FIG. 7 shows the roofing fabric 92 attached to a foot 90 which is inserted into a shoe 81 with the toe 93 under the lip 83 in an alternative construction in which two heels are engaged rather than just the one. In this configuration, outer heel 100 holds a proportion of the tension in the fabric and provides an extended tongue against which to attach the fabric thereby improving the attachment therebetween. The inner heel 88 of the foot 90 then holds the remaining tension. The risk of the toe flexing sufficiently to disengage from the lip is lower than in the preceding embodiment for the same foot length because the toe to inner heel separation is significantly reduced leaving less material available for flexing. This also enables a relatively more flexible extrusion and/or a higher maxi8mum operating temperature. This variant requires a greater degree of rotation of the shoe to engage the toe. While this requires more slack on the fabric in order to fit the shoe, it also provides more positive retention of the foot in the shoe and hence of the fabric relative to the base structure. Successive stages in the mating of the foot in the shoe are shown in FIG. 7 in dotted lines at 101(a), 101(b), 101(c), 101(d) and 101(e).

Figure 8:
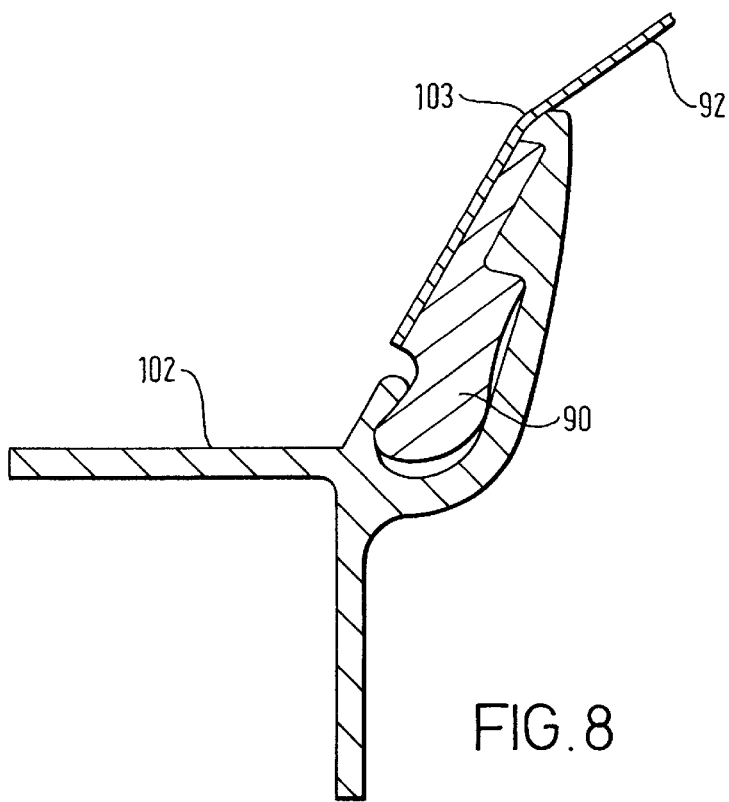
FIG. 8 is a cross-sectional view of the interconnection of FIG. 7 formed as part of an extruded gutter arrangement.

In both embodiments, where applied as part of a roofing system there is a benefit to integrate the shoe extrusion 81 with a gutter as shown in FIG. 8 where 102 represents a shoe/gutter extrusion, 92 is the fabric and 90 is the foot as in FIG. 6. The gutter may be a removable separate extrusion as shown or equally may be extruded as an integral part of a main frame member serving as a roof beam. Aluminum is a suitable material for such extrusions. As well as providing for a drainage channel, a gutter elevates the coupling above any likely water build up. This is important at any non-linear joint between adjacent fabric sections, such as with a square roof or anywhere where it is not feasible to run the shoe extrusion seamlessly around a corner. The resulting gap in the corner can be covered by a local valance which drops below the coupling level.

It is helpful for the end of the heel profile of the shoe to continue into a soft radius as shown in FIG. 8 at 103 to support the fabric 92 as it rotates to its natural tension vector. This mitigates any unnatural local fabric wear and stressing.

If it is necessary to have a highly flexible extrusion for packing purposes namely to enable the roof fabric to be packed for ease of transportation, and/or of run around tight profiles, or otherwise to sustain high tension forces and/or high temperatures, mono axial stiffeners can be used. These could for example make the form of pins or staples running from heel to toe through the body of the foot extrusion. This would present the extrusion from flexing to such a degree as to disengage the toe without compromising the linear axis flexibility.

Therefore, there has been described a system which requires only that a flexible plastic extrusion is welded or bonded to the edge of the fabric, and a mating form included in the rigid frame extrusion. Alternatively the mating extrusion can be on a separate attached gutter. As aforementioned this concept as akin to an extruded foot profile attached to the fabric and an extruded slip on shoe formed into the frame or gutter. To fit the system, the foot is rotated such that the toe can fit under the upper lip of the shoe and, the heel can then drop down and fit into the heel of the shoe. The toe is retained by the lip and the fabric tension vector then holds the heel engaged. Mere loss of tension without sufficient rotation to disengage the heel is not sufficient to release the coupling. the effectiveness of the heel could be improved by providing it with undercut features such as a hook or barb. In this case the shoe would have to be a little longer to permit the foot to move in far enough to clear the undercut in the heel. The foot then moves back as the heel fully engages.

Figure 9A:
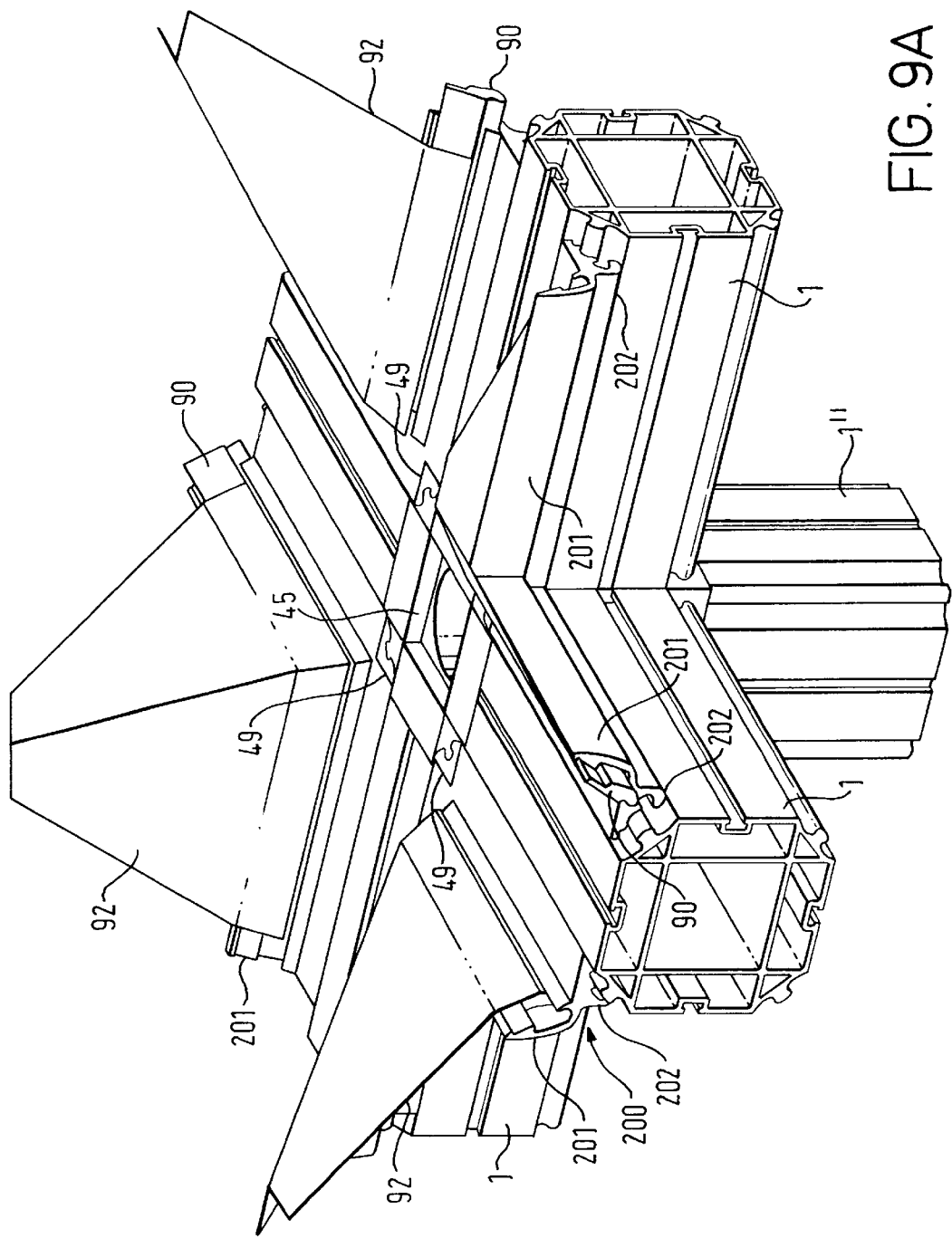
FIG. 9A is a perspective view showing an exemplary roof structure constructed according to the teachings of the present invention.

FIG. 9A is a perspective view showing an exemplary structure wherein a vertical riser has four horizontally-extending beams coupled to its upper end by means of a 4-way node fitting 45 as hereinbefore described with reference to FIG. 4B being secured to the riser, and end fittings 32, as hereinbefore described with reference to FIG. 3, being fitted to the cooperating ends of the horizontal beams. Additionally shown in FIG. 9 is the use of aluminum extrusions 200 comprising a first portion 201 defining a shoe for receiving a foot affixed to the edge of a fabric roof as described hereinbefore with reference to FIG. 7 and a second portion 202 adapted to be released secured to the dovetail edge formations of the horizontal beams by the same means as were described hereinbefore with reference to FIG. 1 for fixing coupling frames 6 to the beams. It will be seen from FIG. 9A that a neat and attractive roof finish can be obtained with the riser furthermore serving to drain water from the roof through the central opening of a 4-way node fitting 45. The use of elastomeric sealing blocks 49 as hereinbefore described with reference to FIG. 4A can also be seen in FIG. 9A.

FIG. 9B shows more clearly the construction of the top lefthand corner of cross-beam of FIG. 9A. The roofing fabric 92 is shown attached to foot 90 which in turn is located in the shoe/gutter extrusion 102 mounted on and locked relative to beam 1 in the manner described herein with reference for example to FIG. 1.

Figure 10:
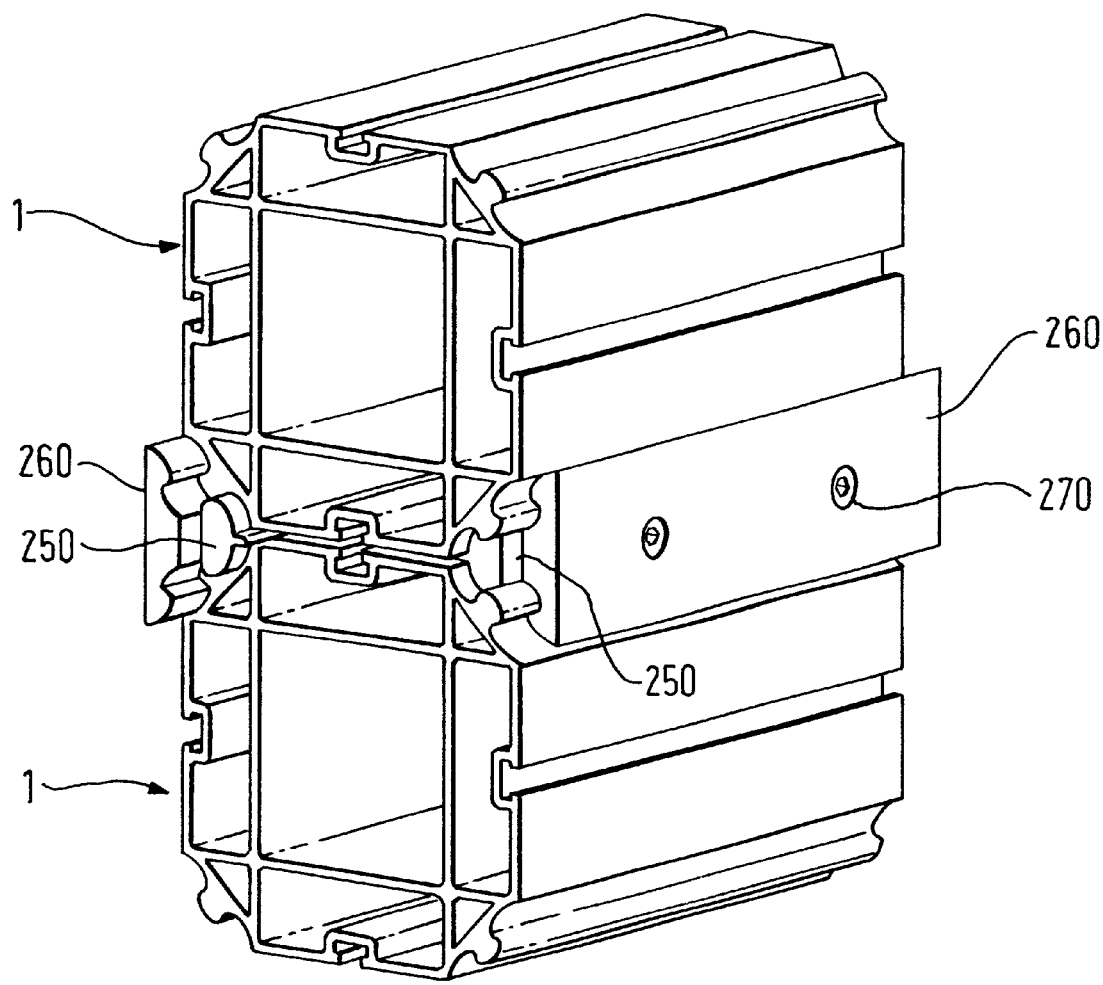
FIG. 10 is a perspective view showing the coupling together of two beam sections.

FIG. 10 shows that the two extruded beam sections as hereinbefore described with reference to FIG. 1 can readily be joined together by means of a first extrusion 250 adapted to locate between the juxtaposed dovetail projections at the juxtaposed edges of the two beams as shown and a second extrusion 260 adopted to overlie the juxtaposed beam edges as shown and to be secured to the first extrusion 250 by means of fixing screws 270.

The invention having been described in the foregoing by reference to particular embodiments, it is to be well understood that the embodiments are exemplary only and that the modifications and variations can be made without departure from the spirit and scope of the appended claims. For example, whilst the curved dovetail profile of the beam edge features shown in FIG. 1 is presently preferred, other shapes would be possible which would enable a complementary shaped panel frame extrusion, beam end fitting or 4-way node fitting to be utilized substantially in the manner herein described. Additionally, in a modification of the arrangement described with reference to FIGS. 6 to 9 for securing a fabric roof the "shoe" could be fitted to the fabric and the "foot" attached to the structure. Furthermore, whilst the pins 20 have been described in the foregoing as being tapped into the ir accommodating recesses 16 using a soft mallet, their helical topography does enable them to be turned (screwed) into position. Additionally, in FIGS. 2A and 2B some of the panel frame sections 67 are shown as open extrusions rather than as solid extrusions and this is a possibility which saves material and may be advantageous, at least from a cost basis, in situations where the high strength of a solid extrusion is not necessary.

What is claimed is:

1. A structural system comprising:
    a first component having a first formation;
    a second component having a second formation complementary to said first formation, said first and second components being interconnectable by virtue of said first and second formations;
    a recess formed in said second component;
    a locking element included in said second component moveable in said recess between an operative position and an inoperative position; and
    an actuating element mounted on said second component, said actuating element moveable relative to said locking element so as to move the locking element out of said recess to engage said first formation to lock said first component and second component together.

2. A system as claimed in claim 1, wherein said actuating element comprises a member insertable into a second recess in said second component, said second recess communicating with said first recess, wherein insertion of said member drives the locking element out of said first recess.

3. A system as claimed in claim 1, wherein said member comprises a tapered pin and said second recess is tapered.

4. A system as claimed in claim 3, wherein said pin has an external screw thread formation and means enabling said pin to be turned by means of a tool.

5. A system as claimed in claim 4, wherein said screw thread formation is a multi-start, low-profile, helical surface protrusion.

6. A system as claimed in claim 1, wherein the action of said actuating element moves said locking element toward said second formation to enable said first formation to be clamped between said locking element and said second formation.

7. A system as claimed in claim 6, wherein said second formation is hooked so as to enable said second component to be hooked onto said first formation pending operation of said locking element by said actuating element to secure said first and second components together.

8. A system a claimed in claim 7, wherein said first formation is generally dovetail-shaped.

9. A system as claimed in claim 1, wherein said first component comprises an elongate beam having said first formation extending along the length thereof.

10. A system as claimed in claim 9, wherein said beam is rectangular in cross-section and has said first formation extending along the length of each of the four edges thereof.

11. A system as claimed in claim 10, wherein said formations are generally inclined surfaces along the edges of the beam.

12. A system as claimed in claim 9 or 10 or 11, wherein said beam is hollow.

13. A system as claimed in claim 12, further comprising strengthening webs within said beam.

14. A system as claimed in claim 13, wherein said beam comprises and aluminum extrusion.

15. A system as claimed in claim 9, wherein said second component comprises a panel frame member enabling an edge of a panel to be secured to said beam.

16. A system as claimed in claim 9, wherein said second component comprises a beam end fitting enabling an edge of a first beam to be secured to a side of a transversely extending second beam.

17. A system as claimed in claim 16, further comprising a node fitting enabling a plurality of beam ends provided with beam end fittings to be secured together on said node fitting with the different beams extending in different directions.

18. A system as claimed in claim 17, wherein said node fitting is adapted to be secured to an end of a riser beam so as to enable a plurality of transverse beams to be coupled orthogonally thereto.

19. A system as claimed in claim 17 or 18, wherein said node fitting is apertured to for serving as a drainage passageway or for conveying service utilities through the node.

20. A system as claimed in claim 18, further comprising adjustment means for adjusting the length of said riser beam.

21. A system as claimed in claim 20, wherein said adjustment means comprises a telescopic arrangement including an adjustable diameter clamping arrangement enabling the telescopic parts to be clamped in an adjusted position.

22. A system as claimed in claim 21, wherein said adjustable diameter clamping arrangement comprises a plurality of circumferentially spaced-apart wedge elements and adjustable means acting upon said wedge elements to determine their radial positions.

23. A system as claimed in claim 22, wherein said adjustable means comprises an adjusting ring screw-threadedly engaged with an outer part of said telescopic arrangement and adjustable to cause said wedge elements to move relative to an inclined surface of said outer part and thereby undergo radially-directed movement.

24. A system as claimed in claim 22 or 23 wherein the radially innermost surfaces of said wedge elements are formed with portions of screw threads and means are engaged with said wedge elements for enabling their rotation in unison within said adjusting ring for effecting fine adjustment of said telescopic arrangement.

25. A system as claimed in claim 1, further comprising means for attaching a fabric sheet to a frame member of the system.

26. A system as claimed in claim 25, wherein the fabric sheet has an extruded formation attached thereto at or adjacent an edge thereof and said frame member has a complementary-shaped formation such as to receive said extruded formation and to retain the same under the tension of the fabric sheet.

27. A system as claimed in claim 26, wherein said extruded formation formed on said fabric sheet is generally in the form of a foot and said complementary-shaped formation is generally in the form of a slip-on shoe for said foot.

28. A system as claimed in claim 27, wherein said foot and said shoe have a plurality of interengageable heel portions.

29. A structure constructed by use of a system as claimed in claim 1.

30. A structural system as claimed in claim 1, further comprising means for securing a fabric sheet to a structural member of the structural system, said fabric sheet having an edge formation extending along or adjacent an edge thereof and said structural member having a complementary formation to said edge formation engageable with said edge formation, one of said edge and complementary formations being substantially in the form of a foot and the other being substantially in the form of a slip-on shoe for said foot, wherein once said edge and complementary formations are engaged, tension in said fabric sheet serves to retain said edge and complementary formations in the engaged condition.

* * * * *